US011786864B2

(12) United States Patent
Li et al.

(10) Patent No.: US 11,786,864 B2
(45) Date of Patent: Oct. 17, 2023

(54) METAL-CONTAINING ZEOLITE BETA FOR $NO_x$ REDUCTION AND METHODS OF MAKING THE SAME

(71) Applicant: PQ CORPORATION, Valley Forge, PA (US)

(72) Inventors: Hong-Xin Li, Lansdale, PA (US); William E Cormier, Harleysville, PA (US); Bjorn Moden, West Chester, PA (US)

(73) Assignee: PQ Corporation, Valley Forge, PA (US)

( * ) Notice: Subject to any disclaimer, the term of this patent is extended or adjusted under 35 U.S.C. 154(b) by 966 days.

(21) Appl. No.: 16/168,356

(22) Filed: Oct. 23, 2018

(65) Prior Publication Data

US 2019/0054420 A1    Feb. 21, 2019

Related U.S. Application Data

(62) Division of application No. 13/110,337, filed on May 18, 2011, now abandoned.

(51) Int. Cl.
*B01D 53/94* (2006.01)
*B01J 29/76* (2006.01)
*C01B 39/46* (2006.01)

(52) U.S. Cl.
CPC ...... *B01D 53/9418* (2013.01); *B01J 29/7615* (2013.01); *C01B 39/46* (2013.01); *B01D 2251/2062* (2013.01); *B01D 2255/20738* (2013.01); *B01D 2255/20761* (2013.01); *B01D 2255/502* (2013.01); *B01J 2229/18* (2013.01)

(58) Field of Classification Search
CPC .......... B01D 2251/00; B01D 2251/206; B01D 2251/2062; B01D 2251/2065; B01D 2251/2067; B01D 2251/208; B01D 2255/50; B01D 2255/502; B01D 2255/207; B01D 2255/20738; B01D 2255/20761; B01D 53/34; B01D 53/92; B01D 53/922; B01D 53/9409; B01D 53/9413; B01D 53/9418; B01D 53/9436; B01D 53/944; B01D 29/7615; B01D 29/00; C01B 39/02; C01B 39/00; C01B 39/46; B01J 2229/18; B01J 29/00; B01J 29/7615

See application file for complete search history.

(56) References Cited

U.S. PATENT DOCUMENTS

2009/0048095 A1*  2/2009  Li .................. B01J 35/1023
502/74

OTHER PUBLICATIONS

Majano et al, "Al-Rich Zeolite Beta by Seeding in the Absence of Organic Template", Chem. Mater. 2009, 21, 4184-4191, (Majano).*

* cited by examiner

*Primary Examiner* — Smita S Patel
(74) *Attorney, Agent, or Firm* — Finnegan, Henderson, Farabow, Garrett & Dunner, LLP (57) ABSTRACT

There is disclosed an organic-free, metal-containing zeolite Beta with a silica-to-alumina ratio (SAR) ranging from 5 and 20, and a metal content of at least 0.5 wt. %. There is also disclosed a method of making such a zeolite Beta without organic structure directing agent (SDA). The metal, which may comprise Fe or Cu, can be found in amounts ranging from 1-10 wt. %. A method of selective catalytic reduction of nitrogen oxides in exhaust gases using the disclosed zeolite is also disclosed.

12 Claims, 12 Drawing Sheets

METAL-CONTAINING ZEOLITE BETA FOR NO$_x$ REDUCTION AND METHODS OF MAKING THE SAME

CROSS-REFERENCE TO RELATED PATENT APPLICATIONS

This application is a Divisional Application of U.S. patent application Ser. No. 13/110,337, the entire contents of which are expressly incorporated herein by reference.

The present disclosure relates to a metal-containing zeolite Beta and methods of making the same. The present disclosure also relates to methods of using such zeolites, including for selective catalytic reduction (SCR) of nitrogen oxides (NO$_x$) in exhaust gases.

Nitric oxides (NO$_x$) have long been known to be polluting gases, principally by reason of their corrosive action. In fact, they are the primary reason for the cause of acid rain. A major contributor of pollution by NO$_x$s is their emission in the exhaust gases of diesel automobiles and stationary sources such as coal-fired power plants and turbines. To avoid these harmful emissions, SCR is employed and involves the use of zeolitic catalysts in converting NO$_x$ to nitrogen and water.

The following patents disclose the use of zeolites or similar catalytic materials, and are herein incorporated by reference: U.S. Pat. Nos. 4,952,385; 4,961,917; 5,451,387; 6,689,709; 7,118,722; 6,890,501.

In general, the synthesis of zeolites, particularly Beta zeolite, occurs in the presence of organic templates, which are known in the art as structure directing agents (SDAs). One common SDA that is typically used to synthesize Beta zeolite is tetraethylammonium hydroxide (TEAOH). However, the drawbacks associated with the use of such SDAs, including in increased material costs, increased processing steps, and adverse effect on environment, make it desirable to develop a process of synthesizing zeolites, such as Beta zeolite, without the use of organic SDAs.

Synthesis of organic-free zeolite Beta was known in the art. See, for example, B. Xie, J. Song, L. Ren, Y. Ji, J. Li, F.-S. Xiao, *Chemistry of Materials,* 2008, 20, 4533, and G. Majano, L. Delmotte, V. Valtchev, S. Mintova, *Chemistry of Materials,* 2009, 21, 4184, both of which are incorporated by reference in their entireties. Neither of these references, however, disclose the claimed method of making a metal containing zeolite Beta, and certainly not one used for selective catalytic reduction of NO$_x$. Thus, there is a need for synthesizing organic-free zeolite Beta, further comprising a metal and that allows for the selective catalytic reduction of NO$_x$ in exhaust gases. As a result, the finished Fe-Beta product is superior to any previous disclosed Fe-zeolites in Fe-dispersion and selective catalytic reduction activity.

SUMMARY

Thus, there is disclosed an organic-free metal-containing zeolite Beta with silica-to-alumina ratio (SAR) ranging from 5 and 20, and a method of making it. The Beta zeolite described herein is synthesized without any direct use of an organic structure directing agent (SDA). Thus, the resulting zeolite Beta has no organic template material in its crystal structure at any point during processing, excluding any residual amount resulting from the seeding materials. In one embodiment, the method of making zeolite Beta according to the present disclosure has silica utilization of greater than 30 percent from the synthesis mixture, such as a silica utilization of greater than 40 percent, or even greater than 50 percent.

In one embodiment, the metal comprises iron (Fe) or copper (Cu) in an amount of at least 0.5 wt. %, such as in an amount ranging from 1-10 wt. %.

In one embodiment, the metal-containing zeolite Beta described herein exhibits a NO$_x$ conversion of at least 40% at 200° C. after being steamed at 700° C. for 16 h in 10% steam with balance air.

There is also disclosed a method of selective catalytic reduction of nitrogen oxides in exhaust gases using the zeolite Beta described herein. In one embodiment, the method comprises at least partially contacting the exhaust gases with a metal-containing zeolite Beta with SAR ranging from 5 and 20 and metal, such as iron or copper, in an amount of at least 0.5 wt %, such as from 1-10 wt. %.

BRIEF DESCRIPTION OF THE DRAWINGS

The accompanying figures are incorporated in, and constitute a part of this specification.

DETAILED DESCRIPTION OF THE INVENTION

Definitions

"Organic-free," refers to a method of making Beta zeolite without the direct use of organic templates, such as organic structure directing agent (SDA), during synthesis. However, it is appreciated that when a seeding material is used, such as a pure Beta zeolite, the seeding material may have been made with or without an SDA. Thus, this term refers to fact that the resulting Beta product has never been in direct contact with an organic structure directing agent (SDA) during any processing step, but that a seed material may have been made using an SDA, providing, at most, residual or secondary contact with the pore structure. In one embodiment, the resulting Beta zeolite, even if exposed to residual or secondary contact with an SDA, would not require one or more post-synthesis treatment steps to open the porous volume of the crystalline framework.

"Silica utilization" refers to the efficiency at which silica is used in the synthesis of zeolite Beta. Silica utilization can be calculated by dividing the silica-to-alumina ratio (SAR) of the product to the SAR of the synthesis mixture excluding the seeding material.

"Hydrothermally stable" means having the ability to retain a certain percentage of initial surface area and/or microporous volume after exposure to elevated temperature and/or humidity conditions (compared to room temperature) for a certain period of time.

"Initial Surface Area" means the surface area of the freshly made crystalline material before exposing it to any aging conditions.

"Initial Micropore Volume" means the micropore volume of the freshly made crystalline material before exposing it to any aging conditions.

"Direct synthesis" (or any version thereof) refers to a method that does not require a metal-doping process after the zeolite has been formed, such as a subsequent ion-exchange or impregnation method.

"Ion Exchange," refers to exchanging non-framework ionic elements and/or molecules contained in zeolitic materials with other elements and/or molecules, such as metals. In general, almost any conceivable element can be used in the ion exchange step, including at least one element selected from the following group: Cu, Fe, Co, Cr, Ni, V, and Nb, preferably Cu and Fe.

"Defined by the Structure Commission of the International Zeolite Association," is intended to mean those structures included but not limited to, the structures described in "Atlas of Zeolite Framework Types," ed. Baerlocher et al., Sixth Revised Edition (Elsevier 2007), which is herein incorporated by reference in its entirety.

"Selective Catalytic Reduction" or "SCR" refers to the reduction of $NO_x$ (typically with ammonia) in the presence of oxygen to form nitrogen and $H_2O$.

"Exhaust gas" refers to any waste gas formed in an industrial process or operation and by internal combustion engines, such as from any form of motor vehicle.

The unique pore structure associated with crystalline microporous aluminosilicates, such as zeolites, have led to their successful uses in a wide variety of applications, including as catalysts, adsorbents, and ion-exchangers. In particular, the combination of its unique three dimensional, 12-ring channel system, and it's high thermal stability, has made Beta zeolite one of the most important industrial zeolites. Traditionally, this zeolite was prepared from precursor materials containing organic structure directing agents (SDAs). The SDAs typically used to prepare Beta zeolite (such as TEAOH and dibenzyl-dimethylammonium hydroxide) are not only expensive, but they inevitably are encapsulated in the zeolitic framework, such that a removal step, e.g. heat treating, is required for their removal. In addition, when organic SDAs are used to prepare Beta zeolite, high silica products are typically obtained. For example, the typical SAR of synthetic Beta zeolite is over 20, often over 40.

According to the present invention it has been found that a metal containing Beta zeolite can be produced without using an organic structure directing agent (SDA). By avoiding the use of an organic template, the resulting Beta zeolite does not have unwanted organic materials in the crystalline material. As a result, one or more post-synthetic treatments such as calcination for removing SDAs from the crystallized material is unnecessary.

Thus, there is disclosed a metal-containing zeolite Beta that has never been in contact with an organic structure directing agent (SDA) and a method of making the same. In one embodiment, the zeolite Beta has a SAR ranging from 5 to 20, preferably not more than 12, such as a range from 5 to 11.

In one embodiment, the zeolite Beta disclosed herein has crystal size greater than 0.1 microns, such as a crystal size ranging from 0.2 to 5 microns.

In one embodiment, the metal portion of the zeolite Beta comprises copper or iron, which can be introduced into the zeolite Beta in various ways, such as by liquid-phase, or solid ion-exchange, or impregnation, or incorporated by direct-synthesis. In one embodiment, the metal portion comprises at least 1.0 weight percent of the total weight of the material, such as a range from 1.0-10.0 weight percent of the total weight of the material.

In one embodiment, the metal portion of the zeolite Beta comprises iron in an amount ranging from 1.0 to 10.0 weight percent of the total weight of the material, with at least 60 percent of the iron present as isolated cations at the exchanged sites.

In another embodiment, the metal portion of the zeolite Beta comprises copper in an amount ranging from 1.0 to 10.0 weight percent of the total weight of the material.

The source of iron is typically an iron salt is chosen from ferric nitrate, ferric chloride, ferrous chloride, and ferrous sulfate.

The source of copper is typically chosen from cupric acetate, cupric chloride, cupric hydroxide, cupric nitrate and cupric sulfate.

There is also disclosed a method of making a metal containing zeolite Beta, Generally, the present method is directed to making a metal-containing beta zeolite by first making an aqueous solution comprising NaOH and a source of alumina. Non-limiting examples of sources of alumina that may be used in the present disclosure include sodium aluminate, aluminum hydroxide, alumina, aluminum nitrate, and aluminum sulfate.

Next, a source of silica is added to the solution and mixed. The source of silica may comprise a silica gel or silica sol, which is typically added under vigorous stirring conditions. Non-limiting examples of other sources of silica that might be used include known silicates, such as silica gel, sodium silicate, and sodium metasilicate, as well as colloidal silica, precipitated silica, silica-alumina, and the like.

Next, a source of zeolite Beta is added, typically in an amount ranging from about 1 to 15 weight percent, such as 10 wt. %, with respect to the silica content of the slurry. The source of Beta zeolite is a commercially available Beta. In one embodiment, the source of zeolite Beta are seed crystals comprising a zeolitic material having a Beta framework structure. While the mixture can be prepared by any known means. In one embodiment, mixing by agitation or stirring is used. After mixing for about 30 minutes, a gel is formed. The mixing time can be up to 24 hours, or even up to 48 hours.

Next, the gel is heated to form a product. The duration of the crystallization step varies depending on the desired parameters of the final product, such as crystal size and purity. The synthesis is halted when pure zeolite Beta is formed. In one embodiment, the crystallization step comprises heating the gel in an autoclave at a temperature ranging from 100° C. to 200° C., such as 125° C., for a time ranging from 24 to 200 hours, such as from 40 to 150 hours, or even 50 to 125 hours.

It is important in the commercial manufacturing of zeolite to efficiently use raw materials. In the synthesis of zeolite Beta without SDA, the silica utilization is of the highest importance since it is the largest component by weight in the synthesis mixture. In commercial zeolite synthesis, silica utilization should be greater than 30%, such as greater than 40%, or even greater than 50%. Silica utilization can be calculated by dividing the silica-to-alumina ratio (SAR) of the product to the SAR of the synthesis mixture excluding the seeding material.

Next, the crystallized material is optionally treated with at least one process chosen from isolation, washing and drying. Isolation of the crystallized product occurs using well-known techniques, such as filtration, ultrafiltration, diafiltration, centrifugation and/or decantation methods, wherein filtration methods can involve suction and/or pressure filtration steps.

After the foregoing procedures of filtering, washing and drying, the crystallized product shows a pure-phase Beta zeolite.

With respect to the optional washing steps, suitable agents which may be used include, water, alcohols, such as methanol, ethanol or propanol, or mixtures thereof. Typically, the isolated and purified zeolitic material is washed until the pH of the effluent is in the range of from 6 to 8.

The method may comprise an additional step of removing any residual sodium from the product. This is typically done via an ion-exchange process with known salts or the like, including ammonium salts of Cl, $SO_4$, $NO_3$. In one embodiment, residual sodium is removed by slurrying the product in a solution of a desired salt, such as $NH_4NO_3$, for example slurrying the solid at least one time in a $NH_4NO_3$ solution (3.6 M).

In one embodiment, the product may further subject to an ion-exchange and/or impregnation step to increase the amount of metal or add at least one additional metal.

In addition to the inventive method of making and the inventive Beta zeolite, there is disclosed a method of using the disclosed inventive Beta zeolite. For example, a typical exhaust gas of a diesel engine contains from about 2 to 15 volume percent oxygen and from about 20 to 500 volume parts per million nitrogen oxides (normally comprising a mixture of NO and $NO_2$). The reduction of nitrogen oxides with ammonia to form nitrogen and $H_2O$ can be catalyzed by metal-promoted zeolites, hence the process is often referred to as the "selective" catalytic reduction ("SCR") of nitrogen oxides.

Thus, there is also disclosed a method of selective catalytic reduction of nitrogen oxides in exhaust gas. In one embodiment, the method comprises:
at least partially contacting exhaust gases with an article comprising a metal-containing zeolite Beta with SAR between 5 and 20, where the zeolite Beta is made without organic structure directing agent (SDA) and the metal comprises iron and/or copper in an amount of at least 1.0 wt %, such as an amount ranging from 1-10 wt. %.

It is appreciated that the contacting step may be performed in the presence of ammonia, urea or an ammonia generating compound. Non-limiting examples of ammonia generating compounds include, ammonium carbamate, ammonium formate, ammonium carbonate and metal-ammine complexes. It is appreciated that any compound that is capable of generating ammonia may be used in the contacting step described herein. In this embodiment, the contacting step is typically performed in the presence of a hydrocarbon compound.

In one embodiment, the article described herein may be in the form of a channeled or honeycombed-shaped body; a packed bed; microspheres; or structural pieces. The packed bed may comprise balls, pebbles, pellets, tablets, extrudates, other particles, or combinations thereof. The structural pieces may be in the form of plates or tubes. In addition, the channeled or honeycombed-shaped body or structural piece may be formed by extruding a mixture comprising the Beta zeolite.

In one embodiment, the metal-containing zeolite Beta described herein exhibits an $NO_x$ conversion of at least 40% at 200° C. for selective catalytic reduction with an ammonia generating compound after exposure to 700° C. for 16 h in the presence of up to 10 volume % of water vapor.

Thus, in one embodiment there is also disclosed a method of SCR of nitrogen oxides in exhaust gases which comprises at least partially contacting an exhaust gas with the Beta zeolite disclosed herein. In order to reduce the emissions of nitrogen oxides various exhaust gases, ammonia is typically added to the gaseous stream containing the nitrogen oxides. In one embodiment of the present invention, ammonia is used to allow the gaseous stream, when contacted with the inventive Beta zeolite at elevated temperatures, to catalyze the reduction of nitrogen oxides.

In one embodiment, a urea solution may be used to provide the ammonia to the gaseous stream. This is particularly true when used in automotive exhaust treatment applications and stationary $NO_x$ reduction applications.

Non-limiting examples of the types of exhaust gases that may be treated with the disclosed zeolites include both automotive exhaust, from on and off road vehicles, including diesel engines. In addition, exhaust from stationary sources, such as power plants, stationary diesel engines, and coal-fired plants, may be treated. Thus, there are also disclosed methods of treating exhaust emissions, such as automotive exhaust or exhaust from stationary sources.

The Beta zeolite of the present invention may be provided in the form of a fine powder which is admixed with or coated by a suitable refractory binder, such as alumina, bentonite, silica, or silica-alumina, and formed into a slurry which is deposited upon a suitable refractory substrate. In one embodiment, the carrier substrate may have a "honeycomb" structure. Such carriers are well known in the art as having a many fine, parallel gas flow passages extending there through. Non-limiting examples of the material used to make the honeycomb structure comprise cordierite, mullite, silicon carbide, alumina, titania, zirconia, silica, alumina-silica, alumina-zirconia, stainless steel, Fe—Cr—Al alloy and the combinations thereof.

In another embodiment, the Beta zeolite may be provided in discrete forms (as opposed to a coating on a substrate). Non-limiting examples of such forms include pellets, tablets or particles of any other suitable shape, for use in a packed bed, for example. The Beta zeolite according to the present invention may also be formed into shaped pieces such as plates, tubes, or the like.

Aside from the subject matter discussed above, the present disclosure includes a number of other exemplary features such as those explained hereinafter. It is to be understood that both the foregoing description and the following description are exemplary only.

EXAMPLES

Example 1. Synthesis of Organic-Free Beta (SAR=10.3) and Subsequent Fe-Exchange to Make Fe-Beta (4.0 wt % Fe, SAR=10.3)

Water, NaOH (50%) and sodium aluminate (23.5% $Al_2O_3$, 19.6% $Na_2O$) were mixed together. Silica gel (PQ Corporation) was added to the solution and mixed vigorously for 1 hour. Finally, commercially available zeolite Beta (Zeolyst International) in the amount of 5 wt. % with respect to the silica content of the slurry were added to the mixture and stirred for 30 minutes. The gel had the following molar composition:

15.0 $SiO_2$:1.0 $Al_2O_3$:3.8 $Na_2O$:259 $H_2O$

The gel was loaded into a 45-mL Parr bomb and heated under static conditions to 125° C. for 120 hours. After cooling, the product was recovered by filtration and washing. The X-ray diffraction pattern of the product showed pure-phase zeolite Beta.

To remove residual sodium, the solid was slurried in a 3.6 M $NH_4NO_3$ solution and stirred at 90° C. for 2 hours. This $NH_4NO_3$ exchange process was repeated twice. After filtering, washing, and drying, the final product had silica-to-alumina ratio (SAR) of 10.3. The BET surface area of the product was 665 $m^2/g$ and micropore volume was 0.23 cc/g.

The sample was then ion-exchanged with a $FeSO_4$ solution at 70° C. for 2 hours. After filtering, washing and drying, the Fe-Beta product contained 4.0 wt. % Fe.

After steaming at 700° C. for 16 hours in 10% steam/air, the BET surface area of the material was 461 $m^2/g$ and the micropore volume was 0.15 cc/g.

Example 2. (Comparable): Fe-Beta (1.0 wt. % Fe, SAR=25) by Aqueous Ion-Exchange Commercial Beta zeolite from Zeolyst (CP 814E, SAR=25) was ion-exchanged with $FeCl_2$ solution at 80° C. for 2 hours. After filtering, washing and drying, the Fe-Beta product had 1.0 wt. % Fe, a BET surface area of 693 $m^2/g$ and a micropore volume of 0.19 cc/g.

After steaming at 700° C. for 16 hours in 10% steam/air, the surface area of the material was 590 $m^2/g$ and the micropore volume was 0.16 cc/g.

Example 3. Synthesis of Organic-Free Beta

Water, NaOH (50%) and sodium aluminate (23.5% $Al_2O_3$) were mixed together. Silica gel (PQ Corporation) was added to the solution and mixed vigorously for 1 hour. Finally, commercially available zeolite Beta (Zeolyst International) in the amount of 10 wt. % with respect to the silica content of the slurry were added to the mixture and stirred for 24 hours. The gel had the following molar composition.

32.8 $SiO_2$:1.0 $Al_2O_3$:9.2 $Na_2O$:794 $H_2O$

The gel was loaded into a 2-liter Parr autoclave and heated at 125° C. for 47 hours under static conditions. After cooling, the product was recovered by filtration and washing. The X-ray diffraction pattern of the product showed pure-phase Beta zeolite.

To remove residual sodium, the solid was slurried in a 3.6 M $NH_4NO_3$ solution and stirred at 90° C. for 2 hours. This $NH_4NO_3$ exchange process was repeated twice. The properties of the material after filtering, washing, and drying are listed in Table 1.

The sample was then ion-exchanged with a $FeSO_4$ solution at 70° C. for 2 hours, followed by filtering, washing and drying. The Fe content, surface area and micropore volume are listed in Table 2.

Example 4. Synthesis of Organic-Free Beta

Water, NaOH (50%) and sodium aluminate (23.5% $Al_2O_3$) were mixed together. Silica gel (PQ Corporation) was added to the solution and mixed vigorously for 1 hour. Finally, commercially available zeolite Beta (Zeolyst International) in the amount of 10 wt. % with respect to the silica content of the slurry were added to the mixture and stirred for 24 hours. The gel had the following molar composition.

22.0 $SiO_2$:1.0 $Al_2O_3$:6.2 $Na_2O$:337 $H_2O$

The gel was loaded into a 2-liter Parr autoclave and heated at 125° C. for 52 hours while stirring at 100 rpm. After cooling, the product was recovered by filtration and washing. The X-ray diffraction pattern of the product showed pure-phase Beta zeolite.

To remove residual sodium, the solid was slurried in a 3.6 M $NH_4NO_3$ solution and stirred at 90° C. for 2 hours. This $NH_4NO_3$ exchange process was repeated twice. The properties of the material after filtering, washing, and drying are listed in Table 1.

The sample was then ion-exchanged with a $FeSO_4$ solution at 70° C. for 2 hours, followed by filtering, washing and drying. The Fe content, surface area and micropore volume are listed in Table 2.

The $NH_4$-exchanged Beta from this example was also ion-exchanged to obtain different Fe-loadings using $FeSO_4$ solutions at 20° C. for 2 hours, followed by filtering, washing and drying.

The $NH_4$-exchanged Beta from this example was also ion-exchanged with copper nitrate to obtain a sample containing 4.8% Cu.

TABLE 1

Properties of $NH_4$-exchanged organic-free Beta samples

| | Example | | | |
|---|---|---|---|---|
| | 1 | 2 | 3 | 4 |
| Crystal size (microns) | 0.4-0.6 | 0.1 | 0.1-0.3 | 0.2-0.5 |
| SAR ($SiO_2/Al_2O_3$ molar ratio) | 10.3 | 25 | 10.8 | 9.3 |
| Surface Area ($m^2/g$) | 665 | 696 | 679 | 672 |
| Micropore Volume (cc/g) | 0.23 | 0.18 | 0.23 | 0.23 |
| Acidity (mmol/g) | 2.1 | 1.0 | 2.1 | 2.0 |
| Silica utilization in synthesis (%) | 69 | — | 33 | 42 |

TABLE 2

Properties of Fe-exchanged Beta samples in fresh form and after steaming at 700° C. for 16 h in 10% water/air.

| | Example | | | |
|---|---|---|---|---|
| | 1 | 2 | 3 | 4 |
| Fe (wt %) | 4.0 | 1.0 | 3.4 | 2.0 |
| Fresh sample | | | | |
| Surface Area (m²/g) | | 693 | 621 | 624 |
| Micropore Volume (cc/g) | | 0.19 | 0.21 | 0.22 |
| Sample steamed at 700 C., 16 h, 10% water/air | | | | |
| Surface Area (m²/g) | 461 | 590 | 476 | 494 |
| Micropore Volume (cc/g) | 0.15 | 0.16 | 0.16 | 0.16 |
| Surface area retention (%) | | 85 | 77 | 79 |

Example 5 (Comparable). Fe-Mordenite (1.5 wt. % Fe, SAR=14) by Aqueous Ion-Exchange Commercial mordenite zeolite from Zeolyst (SAR=14) was ion-exchanged with $FeSO_4$ solution at 70° C. for 2 hours. After filtering, washing and drying, the Fe-mordenite product had 1.5 wt. % Fe, a BET surface area of 522 m²/g and a micropore volume of 0.19 cc/g.

After teaming at 700° C. for 16 hours in 10% steam/air, the surface area of the material was 460 m²/g and the micropore volume was 0.15 cc/g.

Example 6 (Comparable). Fe—Y (1.5 wt. % Fe, SAR=5.5) by Aqueous Ion-Exchange

Commercial Y zeolite from Zeolyst (CBV 500, SAR=5.5) was Fe-exchanged. After filtering, washing and drying, the Fe—Y product had 1.5 wt. % Fe, a BET surface area of 759 m²/g and a micropore volume of 0.27 cc/g.

$NH_3$—SCR of NO with Ferrialuminosilicate Zeolites

Figure 1:
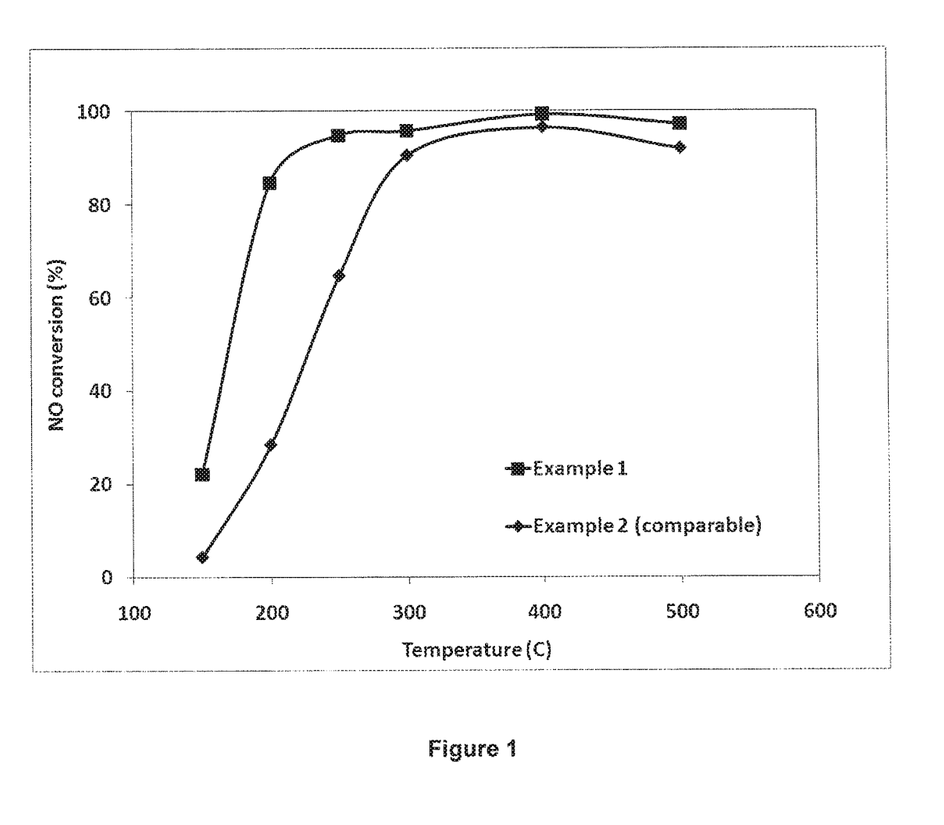
FIG. 1 is a graph showing NO conversion on Fe-Beta materials steamed at 700° C. for 16 h in 10% steam with balance air, on a sample according to the present disclosure and a comparative sample.
Figure 2:
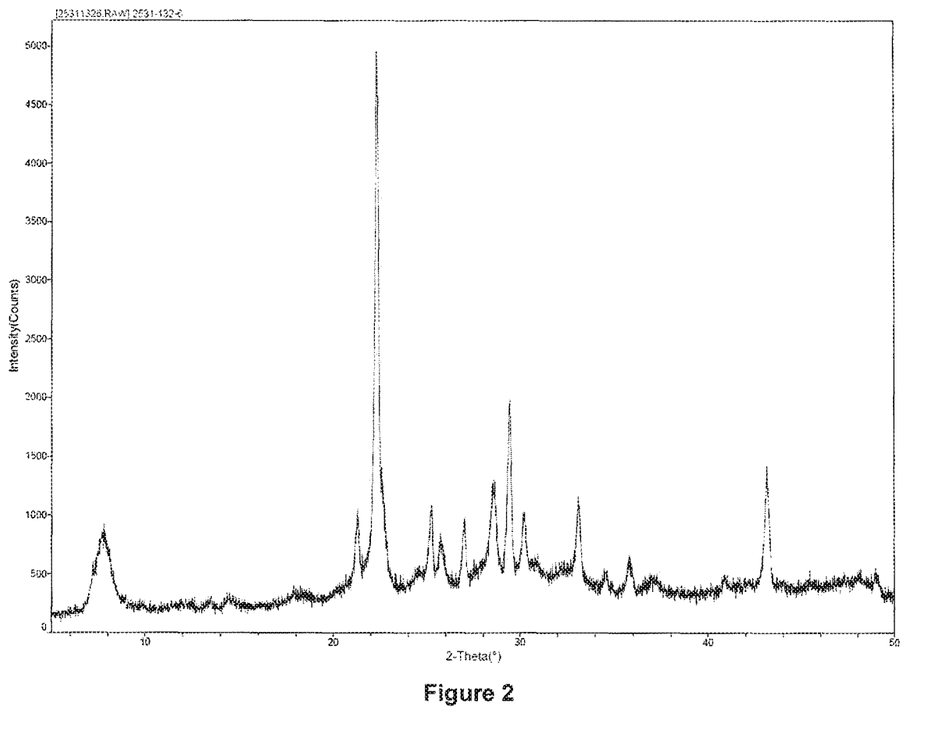
FIG. 2 is an X-ray diffraction pattern of Example 1.
Figure 3:
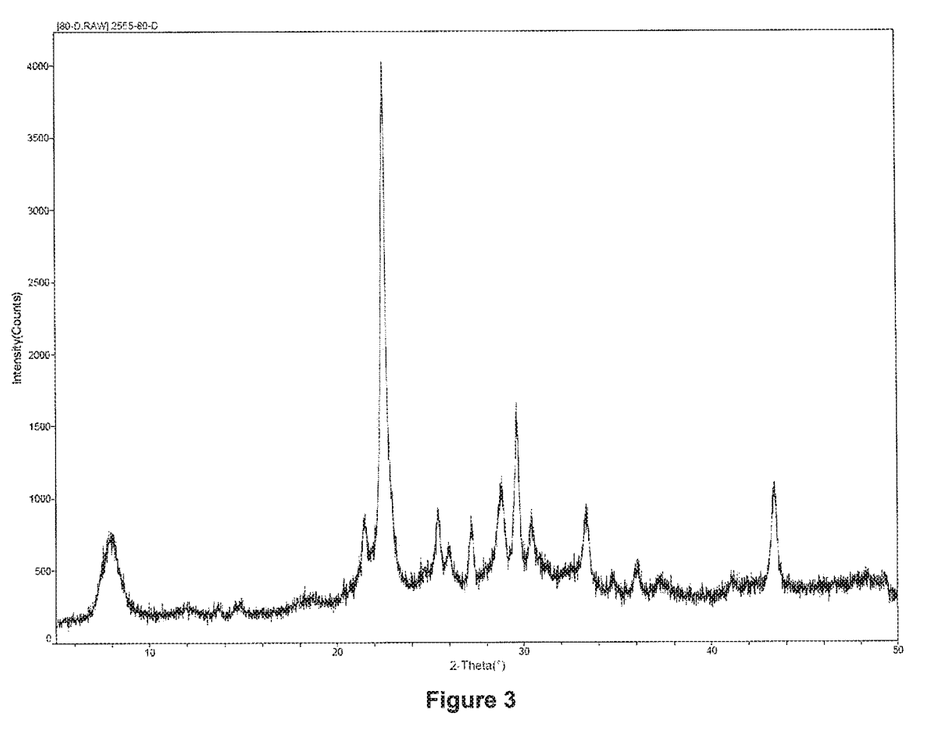
FIG. 3 is an X-ray diffraction pattern of Example 3.
Figure 4:
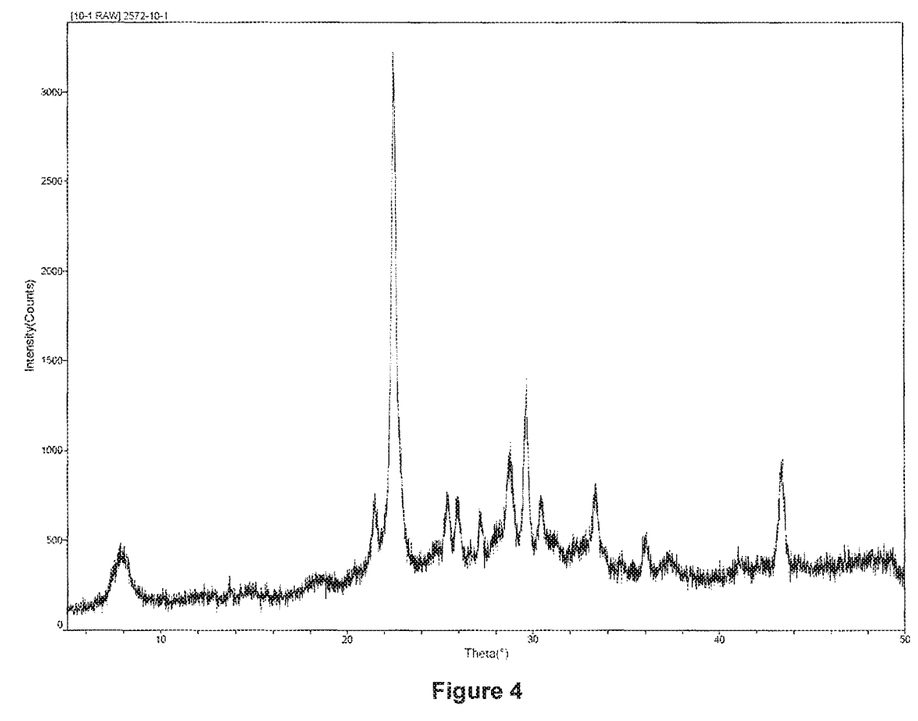
FIG. 4 is an X-ray diffraction pattern of Example 4.
Figure 5:
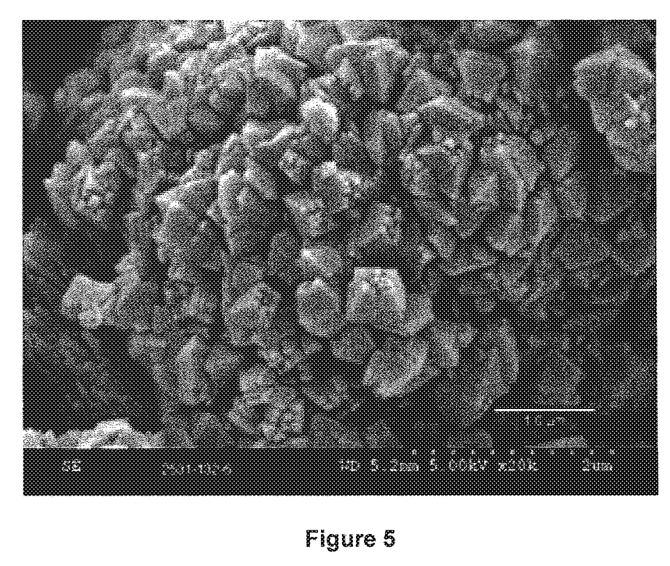
FIG. 5 is a Scanning Electron Microscope image of the material of Example 1.
Figure 6:
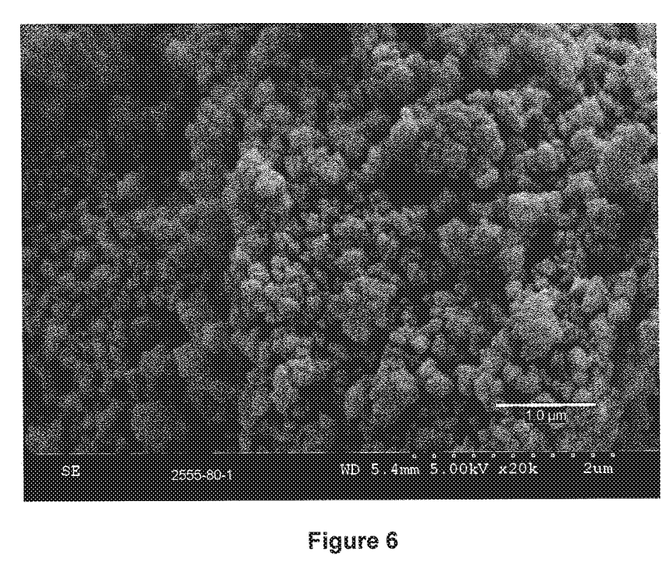
FIG. 6 is a Scanning Electron Microscope image of the material of Example 3.
Figure 7:
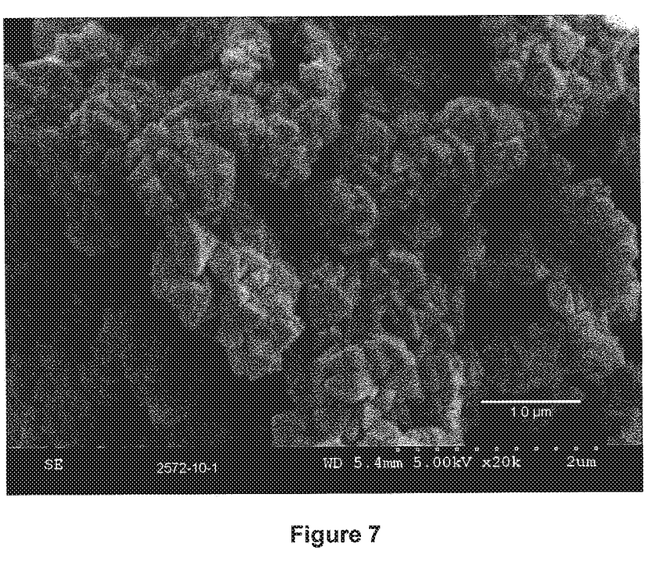
FIG. 7 is a Scanning Electron Microscope image of the material of Example 4.
Figure 8:
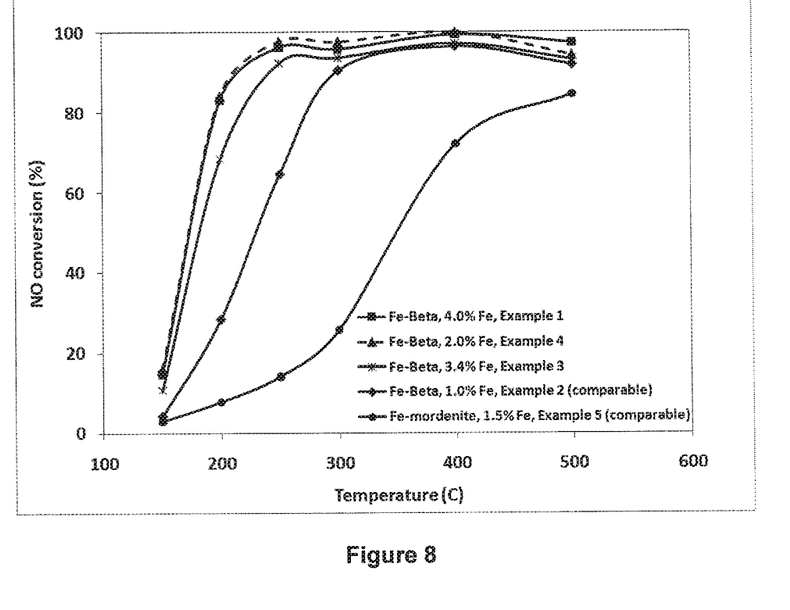
FIG. 8 is a graph showing NH$_3$—SCR activity of Fe-exchanged zeolite Beta and mordenite samples [Steaming: 700° C. for 16 h in 10% steam/air, SCR: 500 ppm NO, 500 ppm NH$_3$, 5% O$_2$, balance inert, SV: 60000 h$^{-1}$].
Figure 9:
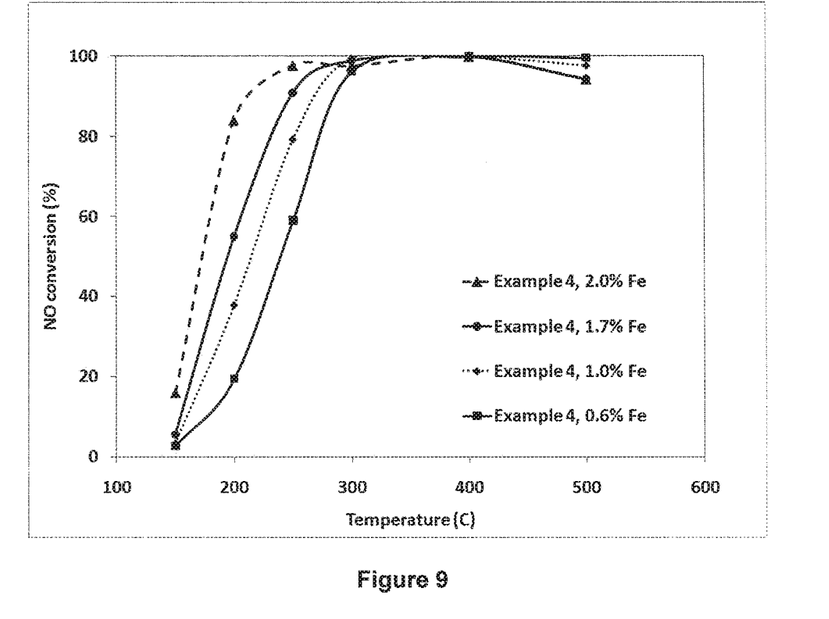
FIG. 9 is a graph showing NH$_3$—SCR activity of Example 4 exchanged with various amounts of Fe [Steaming: 700° C. for 16 h in 10% steam/air, SCR: 500 ppm NO, 500 ppm NH$_3$, 5% O$_2$, balance inert, SV: 60000 h$^{-1}$].
Figure 10:
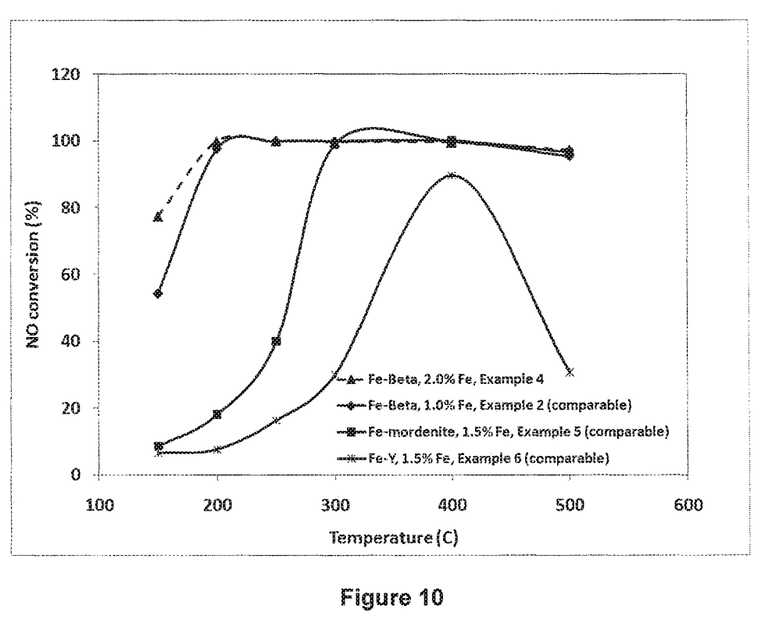
FIG. 10 is a graph showing NH$_3$—SCR activity of fresh Fe-exchanged zeolite Beta, mordenite, and Y samples [SCR: 500 ppm NO, 500 ppm NH$_3$, 5% O$_2$, balance inert, SV: 60000 h$^{-1}$].
Figure 11:
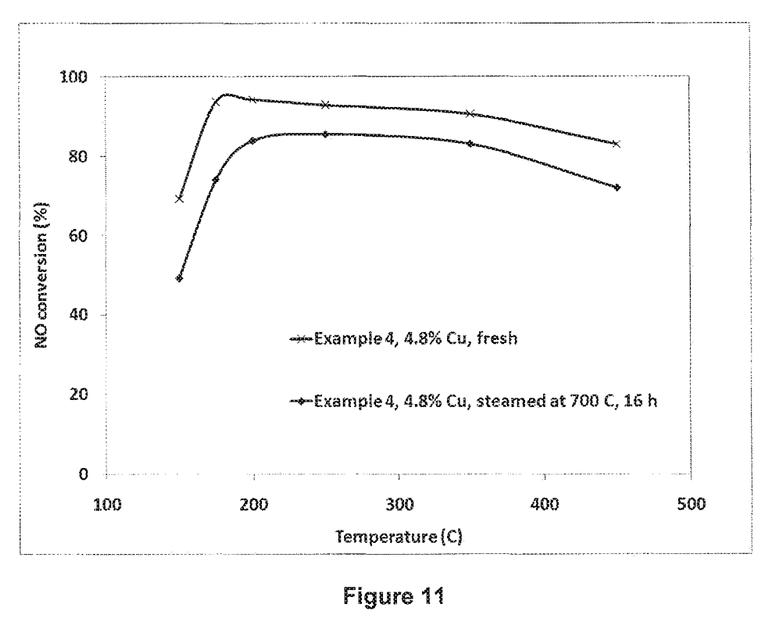
FIG. 11 is a graph showing NH$_3$—SCR activity of fresh and steamed Cu-Beta [Steaming: 700° C. for 16 h in 10% steam/air; SCR: 500 ppm NO, 500 ppm NH$_3$, 5% O$_2$, balance inert, SV: 60000 h$^{-1}$].

The activities of Fe-Beta for NO conversion using $NH_3$ as reductant were evaluated in a flow-through type reactor. Powder zeolite samples were pressed and sieved to 35/70 mesh and loaded into a quartz tube reactor. The gas stream contained 500 ppm NO, 500 ppm $NH_3$, 5% $O_2$, and balance $N_2$. The hourly space velocity for all reactions was 60,000 $h^{-1}$. The reactor temperature was ramped and NO conversion was determined with an infrared analyzer at each temperature interval. FIG. 1 compares SCR of NO with $NH_3$ on Fe-Beta samples steamed at 700° C. for 16 hours in 10% $H_2O$/air.

FT-UV Spectroscopy of Fe-Containing Zeolites

Figure 12:
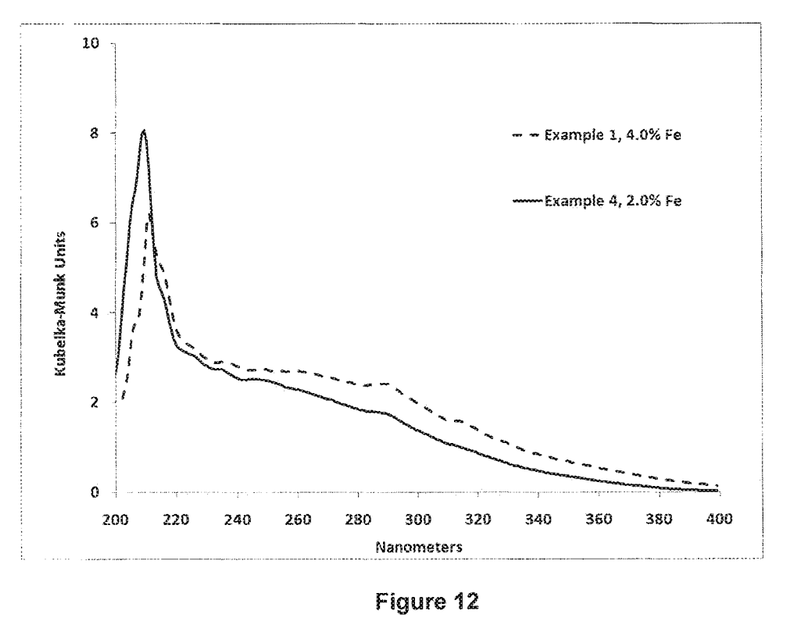
FIG. 12 is a graph showing UV data of Fe-exchanged zeolite Beta samples that were treated under the following conditions prior to recording the spectrum: steaming at 700° C. for 16 h in 10% steam/air; dehydrated in situ to 400° C., followed by cooling down to ambient temperature.
Figure 13:
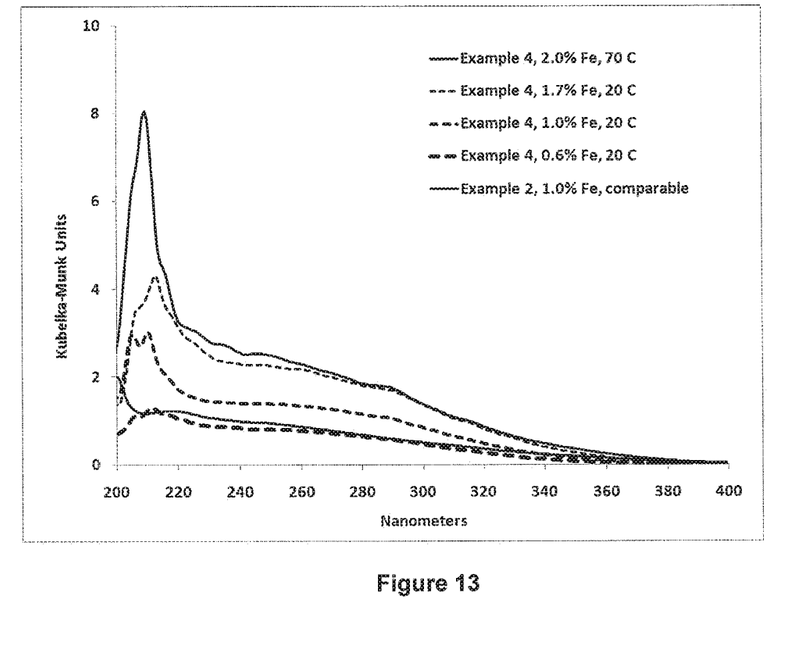
FIG. 13 is a graph showing UV data of Example 4 exchanged with various amounts of Fe. Prior to recording the spectrum, the material was treated as follows: steaming at 700° C. for 16 h in 10% steam/air; dehydrated in situ to 400° C., followed by cooling down to ambient temperature.

UV spectra were collected at ambient temperature from 200 to 400 nm on steamed Fe-samples after evacuation in situ at 400° C., and are shown in FIGS. 12 and 13. The spectra were deconvoluted to 5 Gaussian peaks centered at 192, 209, 228, 266 and 308 nm (+/−10 nm variation for each peak) with a fit accuracy of $R^2$>0.99. Peak areas as well as peak area percentages are shown in Table 3. The peaks centered below 300 nm are associated with isolated Fe-species, whereas the peaks above 300 nm are associated with oligomeric Fe-species. Fe-exchanged materials of various Fe-loadings based on Beta made in Example 4 have more than 80% of Fe as isolated Fe-sites, whereas Comparable Example 2 has 73% isolated sites.

TABLE 3

Peak integrations of the UV data from FIG. 13

| | Example | | | | |
|---|---|---|---|---|---|
| | 4 | 4 | 4 | 4 | 2 |
| Fe (wt %) | 0.6 | 1.0 | 1.7 | 2.0 | 1.0 |
| $NO_x$ conversion at 200° C. (%) | 19 | 38 | 55 | 84 | 28 |
| Total area (KM × nm) | 105 | 184 | 287 | 350 | 140 |

| Peak position | Area (KM × nm) | Area (KM × nm) | Area (KM × nm) | Area (KM × nm) | Area (KM × nm) |
|---|---|---|---|---|---|
| 192 nm | 6 | 5 | 7 | 7 | 12 |
| 209 nm | 21 | 40 | 55 | 87 | 13 |
| 228 nm | 27 | 47 | 73 | 101 | 33 |
| 266 nm | 33 | 62 | 97 | 98 | 44 |
| 308 nm | 19 | 31 | 55 | 57 | 38 |

| Peak position | Area % | Area % | Area % | Area % | Area % |
|---|---|---|---|---|---|
| 192 nm | 5 | 3 | 3 | 2 | 9 |
| 209 nm | 20 | 22 | 19 | 25 | 9 |
| 228 nm | 26 | 25 | 25 | 29 | 24 |
| 266 nm | 31 | 33 | 34 | 28 | 31 |
| 308 nm | 18 | 17 | 19 | 16 | 27 |
| Percent isolated Fe (<300 nm) | 82 | 83 | 81 | 84 | 73 |

The NH$_3$—SCR activity correlates well with the peak area of the UV peaks centered at 209 and 228 nm, i.e. the larger those peak areas, the more active the material is. For example, Beta in Example 4 with 1.0% Fe has peak areas of 40 and 47 area units (KM units×nm) at 209 and 228 nm, respectively, and 38% NOx conversion at 200° C. Beta in Example 4 with 1.7% Fe has peak areas of 55 and 73 KM units×nm at 209 and 228 nm, respectively, and a NOx conversion of 55%, Zeolite Beta in Example 4 with 2.0% Fe has peak areas of 87 and 101 KM units×nm at 209 and 228 nm, respectively, and a NOx conversion of 84%. The increase in the NOx conversion occurs simultaneously with the increase in peak areas at 209 and 228 nm suggesting that these bands are associated with the active sites for NH$_3$—SCR in these materials.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of selective catalytic reduction of nitrogen oxides in an exhaust gas, said method comprising:
   at least partially contacting said exhaust gas with an article comprising an organic-free, iron-containing zeolite Beta having a molar silica-to-alumina ratio ranging from 5 to 20,
   wherein said iron is present in an amount ranging from 1.0 to 10 wt. % based on a total weight of said organic-free, iron-containing zeolite Beta with at least 60% of said iron is present as an isolated cation at a cation exchanged site,
   wherein said organic-free, iron-containing zeolite Beta exhibits an NOx conversion of at least 55% at 200° C. for selective catalytic reduction with an ammonia generating compound after exposure to 700° C. for 16 h in a presence of up to 10 volume % of water vapor, wherein said organic-free, iron-containing zeolite Beta has a crystal size greater than 0.1 micron.

2. The method of claim 1, wherein said organic-free, iron-containing zeolite Beta having the molar silica-to-alumina ratio ranging from 5 to 11.

3. The method of claim 1, wherein if said organic-free, iron-containing zeolite Beta contains organic structure directing agent (SDA) within the pore structure, said SDA is originated from a seed material during synthesis.

4. The method of claim 1, wherein said at least partially contacting step is performed in a presence of urea.

5. The method of claim 1, wherein said iron is introduced by liquid-phase or solid ion-exchange, impregnation, or incorporated by direct synthesis.

6. The method of claim 1, wherein said iron comprises an amount ranging from 2.0 to 10.0 wt. % based on the total weight of said organic-free, iron-containing zeolite Beta.

7. The method of claim 1, wherein said iron comprises an amount ranging from 3.0 to 8.0 wt. % based on the total weight of said organic-free, iron-containing zeolite Beta.

8. The method of claim 1, wherein said organic-free, iron-containing zeolite Beta has crystal size ranging from 0.2 to 5 microns.

9. The method of claim 1, wherein said article is in the form of a channeled or honeycombed-shaped body; a packed bed; microspheres; or structural pieces.

10. The method of claim 9, wherein said packed bed comprises balls, pebbles, pellets, tablets, extrudates, other particles, or combinations thereof.

11. The method of claim 9, where said structural pieces are in the form of plates or tubes.

12. The method of claim 9, wherein the channeled or honeycombed-shaped body or structural piece is formed by extruding a mixture comprising the organic-free, iron-containing zeolite Beta.

* * * * *